United States Patent [19]

Van Der Meulen et al.

[11] 4,265,133
[45] May 5, 1981

[54] DRIVE DISC-PULLEY ASSEMBLY

[75] Inventors: Douglas J. Van Der Meulen, Shelbyville; Siegfried K. Weis, Byron Center, both of Mich.

[73] Assignee: C. L. Frost & Son, Inc., Grand Rapids, Mich.

[21] Appl. No.: 930,520

[22] Filed: Aug. 3, 1978

[51] Int. Cl.³ ...................... F16H 15/08; F16H 55/44
[52] U.S. Cl. ...................................... 74/194; 474/171; 474/182; 474/199
[58] Field of Search .............. 29/159 R; 74/194, 196, 74/197, 230.3, 230.8, 230.14

[56] References Cited

U.S. PATENT DOCUMENTS

| | | | |
|---|---|---|---|
| 1,627,558 | 5/1927 | Grunwald | 74/230.8 X |
| 2,595,203 | 4/1952 | Reeves | 74/230.8 X |
| 2,655,813 | 10/1953 | Howell | 74/230.8 X |
| 2,669,878 | 2/1954 | Nelson | 74/230.3 |
| 3,813,954 | 6/1974 | Price et al. | 74/194 |

FOREIGN PATENT DOCUMENTS

| | | | |
|---|---|---|---|
| 1009436 | 3/1952 | France | 74/230.8 |
| 535637 | 4/1941 | United Kingdom | 74/230.8 |

Primary Examiner—Lawrence J. Staab

Attorney, Agent, or Firm—Price, Heneveld, Huizenga & Cooper

[57] ABSTRACT

A sheet metal drive disc-pulley assembly adapted for driving rotation by a V-belt to drive a friction wheel such as that in a lawn mower or other mechanism using a drive assembly. Two of three, coaxial, circular pieces of sheet metal define a bearing pocket, which axially and radially locates a bearing unit, and a V-belt receiving groove which, in the preferred embodiment, is spaced outwardly and radially aligned with the bearing pocket for proper resistance to belt tension. The marginal edge of the generally planar, third piece is bent and clamped around the periphery of a conical brace extending from the flared edge of the V-belt groove on one of the first two pieces to form a radially extending friction wheel engaging disc. Either the third piece, or a fourth circular piece of sheet metal clamped between the third piece and conical brace, may radially locate a second, axially self-locating bearing unit which is coaxial and spaced an axial distance from the first bearing unit to prevent preloading of the assembly and to reduce rotational wobble due to any bearing eccentricities or slight bearing misalignment. The bearing units preferably include internal seals. An external seal retained by the bearing pocket may also be included.

22 Claims, 11 Drawing Figures

U.S. Patent  May 5, 1981  Sheet 1 of 2  4,265,133
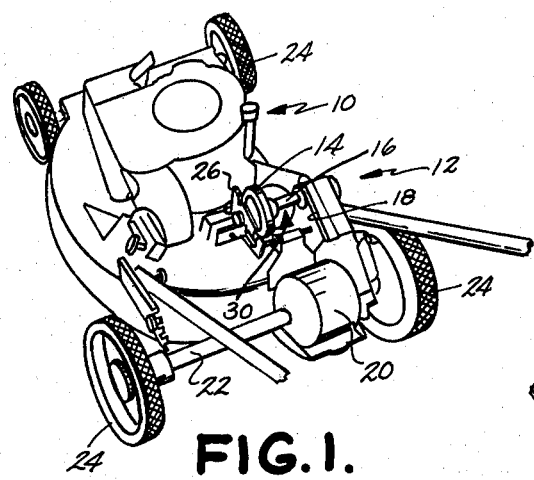
FIG. 1.
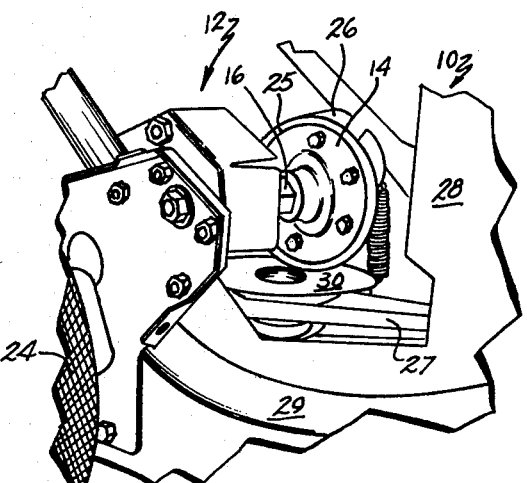
FIG. 2.
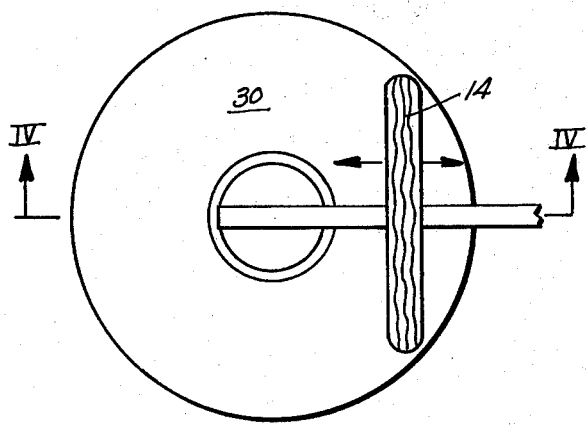
FIG. 3.
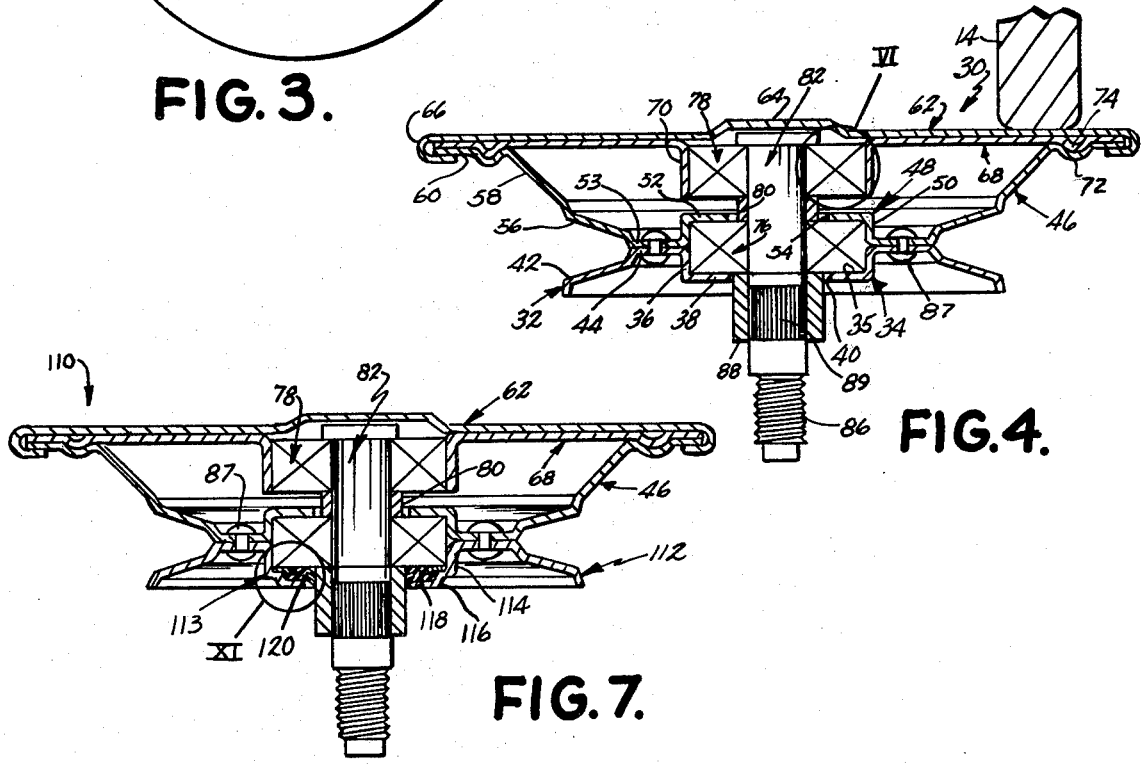
FIG. 4.
FIG. 7.

DRIVE DISC-PULLEY ASSEMBLY

BACKGROUND OF THE INVENTION

This invention relates to fabricated, sheet metal assemblies, and, more particularly, to a sheet metal drive disc-pulley assembly designed for rotation by a V-belt to drive a friction wheel in a drive assembly such as that used in a lawn mower or garden tractor.

Previously known power drive discs which included V-belt, pulley grooves for rotation of the discs were typically aluminum or zinc castings. Such castings were both expensive to manufacture and less than desirable in operation inasmuch as cast aluminum or zinc are soft, brittle and weak and require a separate, sheet steel or other covering on the friction wheel drive surface to enable proper operation without high wear over long periods.

Another specific problem with previously known aluminum cast drive discs was the difficulty in retaining proper lubricant within the multi-row bearing units used to support such castings. Often, a felt ring was used as a portion of a labyrinth seal adjacent the lower end of such multi-row bearing units. The felt ring tended to withdraw and absorb lubricant from the race areas of the bearing during use and especially the upper row of ball bearings in such units. Accordingly, it was found that the prior aluminum cast drive discs failed prematurely because of an inability to retain proper lubricant within the bearings of the structure.

A less expensive substitute for the aluminum or zinc castings were desired. However, no fabricated, sheet metal pulleys which also included friction wheel drive disc areas were available. Although numerous sheet metal pulleys had been previously devised, none were available which could provide a friction wheel engaging disc, especially one which could withstand the necessary loads imposed thereon especially at the periphery at the drive disc for high speed drive engagement. In addition, no sheet metal pulleys were available including drive discs and which also provided adequate support for ball-type or other bearings needed to support the rotatable drive disc.

In keeping with the low cost objective for the fabricated sheet metal drive disc-pulley assembly, it was desired to use other than high precision bearing units. Because such semi-precision bearings often include slight eccentricities in the dimensions of their bearing races, the drive disc-pulley assembly was also required to overcome such eccentricities which otherwise could cause rotational wobble during use of the rotatable assembly. In addition, proper, coaxial alignment of the bearings was required with respect to one another and to the support shaft or axle since misalignment of the bearings can also cause wobbling, vibration, excessive bearing wear and result in premature failure.

Therefore, a need was evident for a low cost, fabricated, sheet metal drive disc-pulley assembly which could adequately support the necessary bearings as well as the loads and stresses imposed by the friction wheels engaged with the assembly, avoid rotational wobble during use because of any bearing eccentricities or misalignment, and retain lubricant properly within the bearings throughout the life of the assembly. The present invention in its various forms was conceived and built in recognition of and as a solution for such needs.

SUMMARY OF THE INVENTION

Accordingly, the present invention provides a sheet metal, drive disc-pulley assembly including at least three separate, circular, coaxial pieces of stamped sheet metal which are configured and secured together in a unique manner. The assembly provides a bearing pocket for receipt of a bearing unit which is preferably radially and axially aligned with a V-belt receiving groove such that the bearing properly withstands belt tension during rotation. A conical brace portion, extending outwardly and away from the V-belt groove securely supports the larger friction wheel drive disc area of the assembly to withstand friction wheel loads imposed thereon. Certain forms of the invention utilize two, separate, bearing units, each of which may include internal seals to prevent loss of lubrication. In such forms, rotational wobble which could occur due to bearing eccentricities or misalignment is reduced and/or prevented by axial spacing of the separate bearing units. Moreover, preloading and prestressing of the assemblies which include the two separate bearing units is prevented by avoiding a fixed, axial location of the second bearing unit with respect to the first and the remainder of the assembly until the assembly is secured in place in its ultimate drive position in a mower or tractor drive assembly or the like.

In one form, the invention is a drive disc-pulley assembly including three separate, coaxial, circular pieces of stamped sheet metal. First means on two of the pieces form a central, radially extending bearing pocket having at least one axially extending, central aperture. The bearing pocket is adapted to receive and retain at least one bearing. Flared means on the two pieces are included and radially offset from the first means which define the bearing pocket to form an outwardly opening, V-belt receiving groove which is coaxial with the bearing pocket. The two pieces of sheet metal are secured together intermediate the V-belt groove and the bearing pocket. One of the two pieces includes a conical brace formed in one piece with and extending outwardly of the flared means forming the V-belt groove. The third piece of sheet metal includes a radially extending, generally planar, friction drive wheel engaging surface and is secured to the conical brace with its outer periphery bent around, enclosing and clamping the outer edge of the conical brace. The drive wheel engaging surface faces away from the V-belt groove.

In other forms, either the third piece, or a fourth piece of sheet metal clamped intermediate the third piece and conical brace, includes an axially extending, annular central flange which radially locates a second bearing coaxially with the first. This flange allows the second bearing to locate itself axially with respect to the first bearing to avoid preloading and prestressing. The two bearings are spaced axially apart by a spacer to reduce and/or prevent rotational wobble. Preferably, the bearings include internal seals to retain lubricant. In addition, an external bearing seal may be provided between the bearing pocket and the axle supporting the bearings adjacent the lower bearing.

In yet another form, which includes only a single bearing, the third piece of sheet metal forming the drive disc portion may include a central recess which is supported by an underlying wall which closes one end of the bearing pocket formed by the remaining two pieces of sheet metal.

Accordingly, the present invention provides a strong durable, light weight, inexpensive drive disc-pulley assembly which overcomes the strength, durability, rotational wobble and lubricant-retaining problems discussed above.

These and other objects, advantages, purposes and features of the invention will become more apparent from a study of the following description taken on conjunction with the drawings.

BRIEF DESCRIPTION OF THE DRAWINGS

FIG. 1 is a fragmentary, perspective view of a self-propelled, rotary lawn mower including a drive mechanism incorporating the drive disc-pulley assembly of the present invention;

FIG. 2 is a fragmentary, perspective view of the drive assembly of the lawn mower shown in FIG. 1;

FIG. 3 is a fragmentary, plan view of the drive disc-pulley assembly together with the movable friction wheel engaging the drive disc portion of the assembly;

FIG. 4 is a sectional, side elevation of the drive disc-pulley assembly taken along plane IV—IV of FIG. 3;

FIG. 7 is a sectional, side elevational of a second embodiment of the drive disc-pulley assembly of the present invention;

DESCRIPTION OF THE PREFERRED EMBODIMENTS

Figure 5:
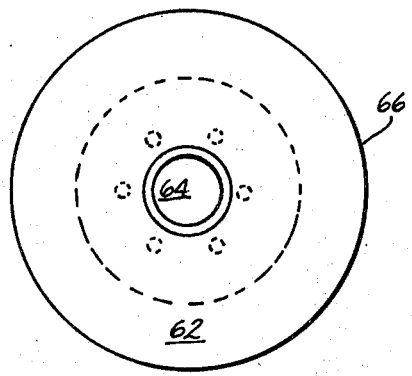
FIG. 5 is a plan view of the drive disc-pulley assembly of FIG. 4.

Referring now to the drawings in greater detail, FIGS. 1 and 2 illustrate a typical, self-propelled lawn mower drive application for the drive disc-pulley assembly of the present invention. The lawn mower 10 includes a drive mechanism 12 including a friction drive wheel 14 mounted for rotation with but axial movement along on a rotatable shaft 16 which drives a belt 18 connected to a gear reducer 20. The gear reducer in turn drives the rear axle 22 and rear drive wheels 24. Drive wheel 14 includes a rubber, outer periphery 25 which frictionally engages the drive disc surface of a drive disc-pulley assembly 30 which is rotationally mounted below the drive wheel. Of course, the other embodiments 110, 140, 150 and 160 of the drive disc-pulley assembly is described herein could be substituted for assembly 30.

Friction wheel 14 is moved axially along shaft 16 by a cable-controlled yoke 26 operated by the mower operator such that the friction wheel will move along a radius of the drive disc-pulley assembly 30 (FIG. 3). When the drive wheel engages the inner part of the wheel, it is rotated more slowly thus moving wheels 24 slowly. Engagement with the outer periphery of the drive disc-pulley assembly 30 rotates the wheel 14 at a faster rate, correspondingly moving wheels 24 at a faster rate. The drive disc-pulley assembly 30 is driven by a belt 27 extending around the drive shaft of engine 28 of the mower which also drives the rotary blade (not shown) beneath mower housing 29.

As shown in FIG. 4, the first embodiment 30 of the drive disc-pulley assembly includes four separate, circular, coaxial, stamped and configured pieces of sheet aluminum or another sheet metal. The first or lowermost piece 32 includes a central, cup-shaped recess 34 forming one half of a centrally located, radially extending, annular, bearing pocket 35 for receiving and retaining a bearing unit for rotationally supporting the assembly as will be more fully described hereinafter. Cup-shaped recess 34 includes an axially extending, annular flange 36 merging into a radially extending flange 38 ending in an inner edge defining an axially extending, central aperture 40 through which an axle for the assembly extends. The outer, annular, marginal portion 42 of first piece 32, which is radially offset from but, coaxial with recess 34, is flared outwardly in the same axial direction as recess 34 to form one half of a V-belt receiving groove at the outer periphery of the first piece 32. Outer margin 42 is continuously joined by recess 34, and particularly flange 36, by a generally planar, radially extending web 44.

The second sheet metal piece 46 has a lower portion formed similarly to first piece 32. Thus, second piece 46 includes a cup-shaped recess 48 having an axially extending, annular flange 50 and a radially extending flange 52 ending at an inner edge defining a central aperture 54 axially aligned and slightly larger in size to aperture 40. An annular portion 56 of second piece 46, which is radially offset from but coaxial with cup-shaped recess 48, is axially flared in the same direction as cup-shaped recess 48 to form the other half of the V-belt receiving groove in cooperation with outer margin 42 of first piece 32. The combined recesses 34, 48 form bearing pocket 35 which is coaxial with, radially offset from, and concentric and axially aligned with the V-belt groove. A generally planar, radially extending web 53 joins portion 56 to cup-shaped recess 48. Extending axially outwardly and away from portion 56 and the V-belt groove, is a conical bracing portion 58 which extends at a slightly smaller angle to the axis of the assembly than does portion 56. Conical portion 58 supports the principal area of engagement of friction drive wheel on the third piece 62 which is secured to the conical brace as explained below. Brace 58 merges continuously with flared portion 56 on one side and ends in a radially extending, outer marginal portion 60 having an annular, outer edge.

Supported by and clamped to the outer, radial margin 60 of conical bracing portion 58 is the third circular piece of sheet metal 62 which forms the generally planar friction wheel engaging surface of the assembly and is continuous and imperforate to exclude dirt and water from the assembly interior. Third piece 62 is larger in diameter than the V-belt groove and includes a circular, raised, central section 64 providing an interior space for receiving the head of the axle which supports the assembly. A rolled or bent periphery 66 extends around the entirety of the circular, outer edge of margin 60 of the second piece 46 and securely clamps the third piece to the second piece.

In addition, bent outer margin 66 clamps an intermediate fourth piece of circular sheet metal 68 intermediate the margin 60 of second piece 46 and the inner side of the third piece 62. The fourth piece of sheet metal is coaxial with the first, second and third pieces and includes a central, annular flange 70 which extends axially toward the bearing pocket 35 and provides an opening extending from the interior surface of third piece 62 at the center of the assembly toward the bearing pocket.

In order to align the second, third and fourth pieces coaxially with one another during assembly, outer margin 60 of second piece 46 and the outer margin of fourth piece 68 are provided with nesting, annular, locating ribs 72, 74. Ribs 72, 74 automatically position flange 70 coaxially with the axis of pieces 32 and 46 and retain flange 70 coaxial with but axially offset from the bearing pocket 35. Flange 70 is also spaced an equivalent radial distance from the central assembly axis as, and is thus aligned with, axially extending flanges 50 and 36 which define the radial end circumference of that pocket. Locating ribs 72, 74 prevent the necessity of tack welding or otherwise fastening fourth piece 68 to the second piece 46 during assembly.

As also shown in FIG. 4, assembly 30 is rotationally supported by a pair of separate, equivalently sized, bearing units 76, 78 which are spaced axially apart by a cylindrical, spacing member 80 along a cylindrical axle 82. First or lower bearing 76 is received and clamped in bearing pocket 35 during assembly while bearing unit 78 is radially located coaxial with bearing 76, but not axially positioned, by bearing locating flange 70. Axle 82 includes a machined head 84 which restrains bearing 78 from axial movement when the axle is secured in a drive assembly by means of its threaded end 86. Bearing unit 78 is not permanently axially positioned by any portion of the assembly 30, except for being spaced from bearing unit 76 by spacer 80, until axle 82 is fixedly secured to another structure. This prevents preloading and pre-stressing of the assembly because of possible bearing radial misalignment and dimensional differences in the races of the respective bearing units. Upon securement to another structure, head 84 clamps the inner race (FIG. 6) against spacer 80 to fix the axial position of bearing 78 with respect to bearing 76. Spacer 80 maintains the axial separation of the units as much as possible to reduce the rotational wobble of the assembly 30 due to such possible eccentricities between the bearing races inasmuch as the bearing units preferred for use in the assembly are not of expensive, high precision but rather lower cost, semi-precision quality. The greater the axial separation of the bearing units, the more the assembly wobble is reduced. The outer race of bearing 78 is not rigidly secured to flange 70 but can move axially to avoid any preloading or pre-stressing. The entire assembly 30 is spaced above the structure for which it is designed to be attached by a cylindrical support spacer 88 also telescoped over end 86 of axle 82.

Figure 6:
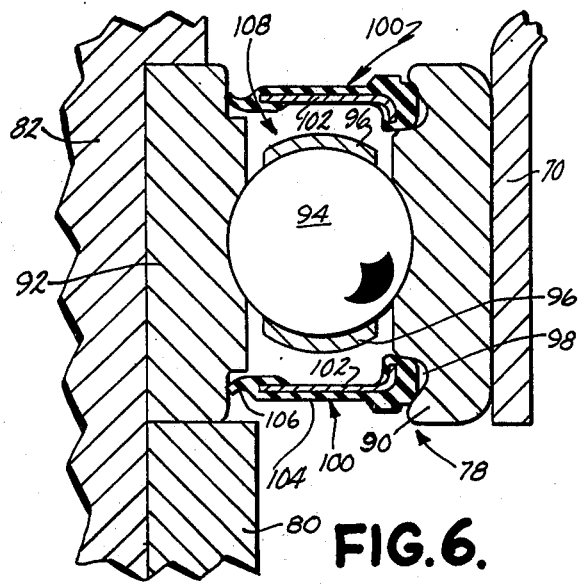
FIG. 6 is a fragmentary, enlarged, sectional view of one of the bearing units in the present invention taken in area VI of FIG. 4.

As is best seen in FIG. 6, each of the bearing units 76, 78 is preferably of the ball-bearing type and includes an annular, outer race 90, an annular, inner race 92 and a plurality of spherical ball bearings or other rolling elements 92 positioned between the races. Outer race 90 of bearing unit 76 is engaged and clamped by flanges 36, 38 and 50, 52 forming bearing pocket 35 such that the outer race turns with the sheet metal assembly. Typically, bearings 92 are retained by formed sheet metal retainers 96. In addition, each of the outer races 90 includes a curved, annular groove 98 adjacent each axial end of the unit receiving an internal, annular seal 100. Preferably, seal 100 includes an annular steel stiffening member 102 extending radially toward the inner race 92. Stiffening member 102 is covered by a molded, resilient, nitrile rubber or synthetic sealing material 104 which not only helps retain seal 100 in groove 98 but also forms a flexible, resilient, inner race-engaging sealing lip 106. Internal seals 100 thereby retain grease or other lubricant within each bearing assembly 76, 78 in cavity 108 between the seals and the bearings 94 and any retainers 96 to prolong life of the assembly.

During assembly, first bearing unit 76 is placed in cup-shaped recess 34 in first piece 32 after which second piece 46 is placed thereover to form the bearing retaining pocket 35 in which bearing 76 is situated. Webs 44, 53 of the first and second pieces are riveted together with annularly spaced rivets 87 to retain bearing unit 76 in place. The fourth piece 68 is then positioned via locating ribs 72, 74 on the outer margin 60 of the second piece. Axle 82, having second bearing unit 78 positioned thereon against head 84 and cylindrical spacer 80 telescoped thereover and against bearing unit 78, is dropped through the opening in the fourth piece 68 and on through openings 54 and 40 which are coaxial with that opening such that bearing 78 slides into and is radially positioned by annular flange 70. The inner races of bearings 76 and 78 are engaged and spaced apart by spacer 80 while the outer race of bearing 78 remains free to locate itself axially within flange 70. Support cylinder 88 is then placed over end 86 of axle 82 and held in place by serrations 89 for shipment. The third piece 62 is then positioned over the fourth piece 68 and the outer margin 68 bent around the entire periphery of the sandwiched, outer margin 60 and the fourth plate with an appropriate tool or press to securely clamp the assembly together. The two, spaced bearings 76, 78, thus, spread any downwardly exerted load or stress imposed by the friction wheel 14 on the outer margin of the third piece 62 and also accommodate the radial load imposed by the tension of the V-belt in the V-belt groove. The friction wheel imposes an axial load at a position which is radially offset from the centerline axis of the assembly. Thus, the two, spaced bearings, better accommodate the reaction to this load. Typically, the engaging force of wheel 14 is approximately 16 pounds minimum while the belt tension exerts a force in excess of 15 pounds.

As shown in FIG. 7, a modified embodiment 110 of the four-piece, drive disc-pulley assembly is shown. Embodiment 110 differs only slightly from embodiment 30 by the addition of an external bearing seal 120 at the bottom of the assembly to further prevent the entry of foreign matter and the escape of lubricant. Embodiment 110 includes a modified, first circular, stamped, sheet metal piece 112 which is the same as that shown in FIG. 10. First piece 12 includes a generally cup-shaped, central recess 113 having an annular, axially extending flange 114 merging into a radially extending flange 116 having an axially outwardly offset, inner edge 118. The offset of edge 118 provides a space for receipt of a bearing seal 120 of the type shown and described in U.S. Pat. No. 3,923,351, assigned to the same assignee as the present invention, the disclosure of which is hereby incorporated by reference.

Figure 11:
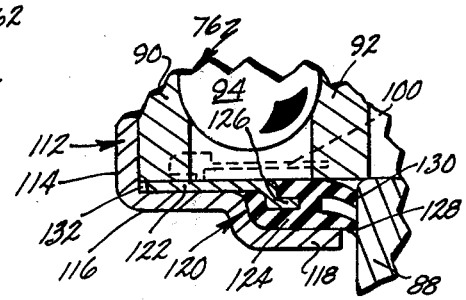
FIG. 11 is a fragmentary, enlarged, sectional view of the external bearing seal in the present invention taken in area XI—XI of FIGS. 7 and 10.

As best seen in FIG. 11, seal 120 includes an annular, metallic, rigid portion 122 to which is integrally molded and bonded a flexible, resilient, wear-resistant, annular portion 124 formed from black, nitrile rubber or the like. Rigid member 122 includes an L-shaped, annular flange 126 to help retain portion 124 while portion 124 includes a pair of axially spaced, sealing lips 128, 130 which engage the cylindrical surface of support cylinder 88 to provide a seal against entry of foreign matter and release of bearing lubricants.

The rigid portion 122 of seal 120 is clamped between flange 116 and the outer race 90 of bearing unit 76 as shown in FIG. 11. Seal 120, therefore, rotates with outer race 90 and the bearing pocket 35 with respect to inner race 92 and axle 82. The axially innermost, sealing lip 130 will at least partially engage inner race 92 to provide additional sealing function. Seal 120 centers itself to accommodate any eccentricities in its formation against cylinder 88 because of the annular space 132 at the outer periphery of the seal prior to clamping of the bearing unit against the seal 120. When external seal 120 is used, the lower bearing unit 76 will preferably also include internal seals 100 as described above and shown in phantom in FIG. 11. These seals prevent the upward and downward release of lubricant from the bearing units even though seal 120 would prevent the downward flow of such lubricant anyway. If desired, a lower bearing unit 76 without internal seals could also be used.

Figure 8:
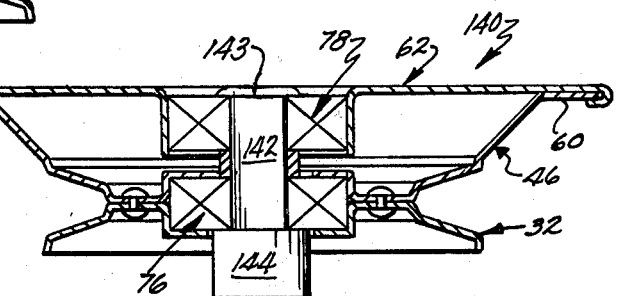
FIG. 8 is a sectional, side elevation of a third embodiment of a drive disc-pulley assembly of the present invention.

Referring to FIG. 8, a third embodiment 140 of the drive disc-pulley assembly is shown. In this form, the fourth piece of sheet metal 68 is eliminated and third piece 62, including bearing locating flange 70, is directly clamped to the outer margin 60 of the second piece 46 which, in this form, does not include any locating ribs. The principle difference of embodiment 140 from embodiment 110 is the inclusion of a modified axle 142 having a small, formed or peened head 143, the upper surface of which is flush with the top surface of the third piece 62 forming the drive disc surface. As such, friction wheel 14 can pass completely over the center portion of the assembly without resistance thereby enabling assembly 140 to be used in drive assemblies providing reverse rotation and movement of the friction drive wheel when it is moved across the center line of the assembly to the opposite side of the friction disc. In addition, embodiment 140 includes a machined, enlarged, support cylinder 144 formed integrally in one piece with axle 142 intermediate bearing 76 and end 146 of the axle. Axle 142 is assembled by insertion through the bearing unit 76 and 78 and spacer 80 after which head 143 is formed to retain the unit together.

Figure 9:
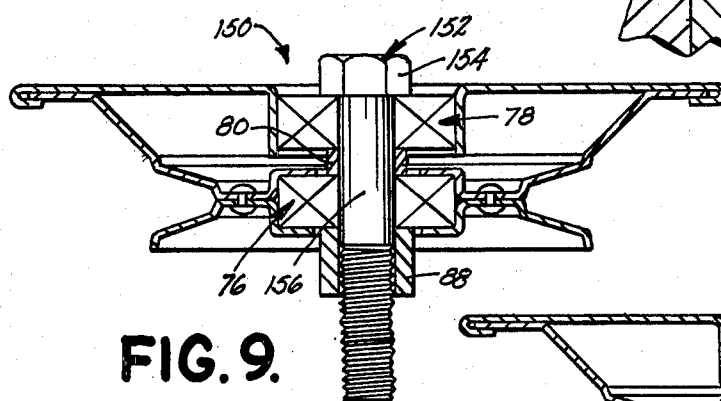
FIG. 9 is a sectional, side elevation of a fourth embodiment of the drive disc-pulley assembly of the present invention.

As shown in FIG. 9, a fourth embodiment 150 of the drive disc-pulley assembly differs only slightly from embodiment 140. Instead of axle 142, a conventional bolt 152 having a hexagonal head 154 and a cylindrical shaft portion 156 ending in a threaded shaft portion 158 is inserted downwardly through bearing units 78, 76 and spacer 80. As in embodiments 30 and 110, a separate cylindrical, tubular, support spacer 88 is telescoped over end 158 of bolt 152 to support the assembly in a drive mechanism. Bolt 152 forming the axle for assembly 150 is somewhat cheaper than providing a machined or turned axle and is suitable for securing the assembly when the friction drive wheel 14 need not pass over the center line to provide a reverse drive direction.

Figure 10:
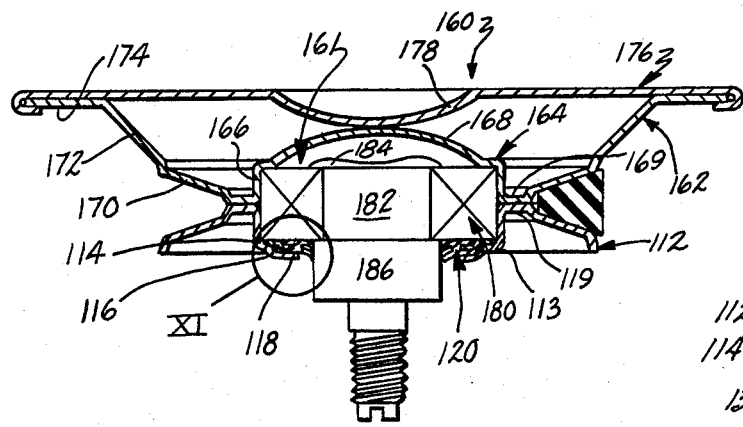
FIG. 10 is a fifth embodiment of the drive disc-pulley assembly of the present invention.

As shown in FIG. 10, a fifth embodiment 160 of the drive disc-pulley assembly includes a first circular, stamped piece of sheet metal 112 which is similar in all respects to first piece 112 described in assembly 110. The second piece of sheet metal 162 includes a central, cup-shaped recess 164 having an annular, axially extending flange 166 merging with a curved, partially spherical, dome-shaped flange 168 closing the entire axial end of the bearing pocket 161 formed together with first piece 112. Bearing pocket 161 is concentric and axially aligned with and radially offset from the V-belt groove. Second piece 162 also includes an outwardly flared, V-belt groove forming portion 170 merging with a conical brace portion 172 ending in a radially extending marginal portion 174 similar to the other embodiments 30, 110, 140 and 150. Web 169 of second piece 162 is spot welded at annularly spaced positions to web 119 of first piece 112.

In assembly 160, a third sheet metal piece 176 is clamped directly to marginal edge portion 174 of the second piece 162 and includes a concave, central recess 178 having a curved, spherical shape. Recess 178 relieves contact with friction wheel 14 when that wheel is moved along shaft 16 (FIG. 3) over the center of assembly 160 so that rotation of the wheel can reverse. The wall of recess 178 engages the axially, upwardly extending wall formed by flange 168 of the bearing pocket to provide support and strength for the assembly, especially at the center.

Bearing pocket 161 receives a bearing unit 180 which need not include internal seals such as those shown at 100 in FIG. 6 but may so include them if desired. First piece 112 includes flanges 114, 116 and 118 described above which receive and retain an external bearing seal 120 of the type described above in connection with FIG. 11. An axle 182 extends within the center aperture of bearing 180 and supports and axially restrains the bearing via a formed head 184 and an integral, cylindrical portion 186 of the axle. Assembly 160 therefore provides rotational support for the drive disc-pulley assembly with a single bearing unit 180 while the bearing pocket 161 can be packed with grease which is retained by the external seal 120.

It will be understood that within the scope of this invention roller bearings of other types of bearings may be substituted for the bearing units 76, 78 and 180. For example, a journal bearing can be substituted for the ball-type bearing 78 while a ball-type bearing is used as lower bearing 76. In addition, various other seals besides internal seals 100 and external seal 120 could be used in keeping with this invention. Also, the V-belt groove in any of the embodiments can be axially offset from the axial position of bearing 76, such as at a position intermediate bearings 76, 78, to help withstand the radial load imposed by tension on the V-belt in the groove.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A drive disc-pulley assembly comprising:
   three separate, coaxial, circular pieces of stamped sheet metal;
   first means on two of said pieces of sheet metal for forming a central bearing pocket having at least one axially extending central aperture therein, said bearing pocket being adapted to receive and retain at least one bearing;
   flared means on said two pieces radially offset from said first means for forming an outwardly opening, V-belt receiving groove coaxial and axially aligned with said bearing pocket;

said two pieces of sheet metal secured together intermediate said V-belt groove and said bearing pocket;

a conical brace formed in one piece with and extending outwardly and away from said flared means on one of said two pieces;

said third piece being axially offset from said V-belt groove and including a radially extending, generally planar friction drive wheel engaging surface and having its outer periphery bent around, enclosing and clamping said outer edge of said conical brace such that in the region of said outer periphery, said drive wheel engaging surface is smooth and continuous, said drive wheel engaging surface having a diameter larger than the largest diameter of said V-belt groove and facing away from said V-belt groove; and axially extending means adjacent said third piece of sheet metal for providing a bearing locator opening toward said bearing pocket and adapted to receive a second bearing.

2. The assembly of claim 1 including a central recess in said third piece of sheet metal.

3. A drive disc-pulley assembly comprising:

three separate, coaxial, circular pieces of stamped sheet metal;

first means on two of said pieces of sheet metal for forming a central bearing pocket having at least one axially extending, central aperture therein, a said bearing pocket being adapted to receive and retain at least one bearing;

flared means on said two pieces radially offset from said first means for forming an outwardly opening, V-belt receiving groove coaxial with said bearing pocket;

said two pieces of sheet metal secured together intermediate said V-belt groove and said bearing pocket;

a conical brace formed in one piece with and extending outwardly and away from said flared means on one of said two pieces;

said third piece of sheet metal including a central recess, and a radially extending, generally planar, friction drive wheel engaging surface and having its outer periphery bent around, enclosing and clamping said outer edge of said conical brace, said drive wheel engaging surface facing away from said V-belt groove; said central recess including an annular, axially extending, bearing locating flange defining a central opening which extends through said third piece of sheet metal and opens toward said bearing pocket.

4. The assembly of claim 3 wherein said bearing pocket is annular and has an outer, circumferential wall including portions of said two pieces of sheet metal; said bearing locating flange being coaxial and aligned with said outer, circumferential wall of said bearing pocket.

5. The assembly of claim 3 including a first bearing received and axially and radially retained in said bearing pocket by said first means; a second bearing coaxial with said first bearing and received within and radially located by said bearing locating flange; a common axle received through and supporting said first and second bearings and having restraining means thereon for axially restraining said bearings; and spacing means received over said axle and intermediate said bearings for spacing said bearings apart within said assembly; said second bearing being axially movable in said bearing locating flange until restrained by said restraining means on said axle.

6. The assembly of claim 5 wherein each of said first and second bearings includes an outer race, an inner race, a plurality of rolling elements between said races, and a pair of axially spaced seals, one seal located adjacent each axial end of said bearing unit and secured to said outer race for movement therewith and slidably and sealingly engaging said inner race to retain lubricant within said bearing.

7. A drive disc-pulley assembly comprising:

three separate, coaxial, circular pieces of stamped sheet metal;

first means on two of said pieces of sheet metal for forming a central bearing pocket having at least one axially extending, central aperture therein, said bearing pocket being adapted to receive and retain at least one bearing;

flared means on said two pieces radially offset from said first means for forming an outwardly opening, V-belt receiving groove coaxial with said bearing pocket;

said two pieces of sheet metal secured together intermediate said V-belt groove and said bearing pocket;

a conical brace formed in one piece with and extending outwardly and away from said flared means on one of said two pieces;

said third piece of sheet metal including a central recess, and a radially extending, generally planar, friction drive wheel engaging surface and having its outer periphery bent around, enclosing and clamping said outer edge of said conical brace, said drive wheel engaging surface facing away from said V-belt groove; said recess being a curved depression in said third piece; said bearing pocket including a curved wall on said second piece closing the axial end of said bearing pocket adjacent said third piece; said curved wall engaging and supporting said curved depression and thus said third piece.

8. A drive disc-pulley assembly comprising:

three separate, coaxial, circular pieces of stamped sheet metal;

first means on two of said pieces of sheet metal for forming a central bearing pocket having at least one axially extending, central aperture therein, said bearing pocket being adapted to receive and retain at least one bearing;

flared means on said two pieces radially offset from said first means for forming an outwardly opening, V-belt receiving groove coaxial with said bearing pocket;

said two pieces of sheet metal secured together intermediate said V-belt groove and said bearing pocket;

a conical brace formed in one piece with and extending outwardly and away from said flared means on one of said two pieces;

said third piece of sheet metal including a radially extending, generally planar, friction drive wheel engaging surface and having its outer periphery bent around, enclosing and clamping said outer edge of said conical brace, said drive wheel engaging surface facing away from said V-belt groove;

a fourth circular piece of sheet metal coaxial with said first three pieces, said fourth piece including a central opening spaced axially from said bearing pocket for receiving a second bearing and having a marginal edge portion clamped intermediate said outer periphery of said third piece and said outer edge of said conical brace.

9. The assembly of claim 8 including a circular, bearing locating flange on said fourth piece defining said central opening, said bearing locating flange extending axially toward said bearing pocket, said central opening extending from the interior of said third piece and opening toward said first means.

10. The assembly of claim 9 wherein said first means include central, coaxial, cup-shaped recesses in each of said two pieces, said cup-shaped recesses opening toward one another and each having a radially extending flange spaced axially from the corresponding flange of the other cup-shaped recess, one of said radially extending flanges including said axially extending central aperture, the other radially extending flange having an axially extending aperture therethrough, said axially extending apertures in said radially extending flanges being coaxial with said opening provided by said bearing locating flange of said fourth piece.

11. The assembly of claim 9 including a first bearing received and axially and radially retained in said bearing pocket by said first means; a second bearing coaxial with said first bearing and received within and radially located by said bearing locating flange; a common axle received through and supporting said first and second bearings and having restraining means thereon for axially restraining said bearings; and spacing means received over said axle and intermediate said bearings for spacing said bearings apart within said assembly; said second bearing being axially movable in said bearing locating flange until restrained by said restraining means on said axle.

12. The assembly of claim 8 wherein said conical brace and said fourth piece include mating locating means for maintaining said fourth piece coaxial with the other pieces.

13. The assembly of claim 12 wherein said locating means include nesting, annular, offset ribs in a portion adjacent said outer edge of said conical brace and said marginal edge portion of said fourth piece.

14. The assembly of claims 7 or 8 wherein said first means includes seal receiving means on the other of said two pieces for receiving and retaining a bearing seal when a bearing is received in said bearing pocket.

15. The assembly of claim 14 including a bearing received and retained in said bearing pocket, said bearing including an outer race, an inner race having an axially extending aperture therethrough, and a plurality of rolling elements received between said races; axle means extending through said inner race aperture for supporting said inner race and having a circumferential surface adjacent the side of said bearing which is adjacent the other of said two pieces; a bearing seal in said seal receiving means and secured against and movable with said outer race and having at least one flexible, resilient sealing lip sealingly engaging said circumferential surface of said axle means to prevent loss of lubricant from said bearing pocket and entry of foreign matter into said bearing pocket.

16. The assembly of claim 15 wherein said axle means include an axle and a cylindrical member telescoped over said axle, said circumferential surface being the outer cylindrical surface of said cylindrical member.

17. A drive disc-pulley assembly comprising:
a first and second coaxial, circular pieces of stamped sheet metal each having a central recess opening axially toward the other, and axially opposing, flared portions radially offset from said recess, said recesses together forming a bearing pocket for receiving a bearing, said flared portions forming a V-belt receiving groove axially aligned and concentric with said bearing pocket, said first and second pieces being secured together intermediate said bearing pocket and V-belt groove;

a conical bracing portion extending in one piece with said axially flared portion on said second circular piece and outwardly and to one side of said V-belt groove, said conical bracing portion having a radially extending outer margin and edge;

said first circular piece having a central aperture in its central recess providing an axle receiving opening to said bearing pocket;

a third, radially extending, generally planar, circular piece of sheet metal coaxial with said first and second pieces, supported by and extending generally parallel to said radially extending outer margin of said conical bracing portion, and having a friction drive wheel engaging surface with a diameter larger than either of said flared portions of said first and second pieces, the outer periphery of said third piece being bent around said outer edge of said second piece to securely clamp said third piece to said second piece such that said friction wheel drive engaging surface is smooth and continuous in the region of said outer periphery; and axially extending means adjacent said third piece of sheet metal for providing a bearing locator opening toward said bearing pocket and adapted to receive a second bearing.

18. A drive disc-pulley assembly comprising:
first and second coaxial, circular pieces of stamped sheet metal each having a central recess opening axially toward the other, and axially opposing, flared portions radially offset from said recesses, said recesses together forming a bearing pocket for receiving a bearing, said flared portions forming a V-belt receiving groove axially aligned and concentric with said bearing pocket, said first and second pieces being secured together intermediate said bearing pocket and V-belt groove;

a conical bracing portion extending in one piece with said axially flared portion on said second circular piece, and outwardly and to one side of said V-belt groove, said conical bracing portion having a radially extending outer margin and edge;

said first circular piece having a central aperture in its central recess providing an axle receiving opening to said bearing pocket;

a third, radially extending, generally planar, circular piece of sheet metal coaxial with said first and second pieces and supported by said radially extending outer margin of said conical bracing portion, the outer periphery of said third piece being bent around said outer edge of said second piece to securely clamp said third piece to said second to form a friction wheel drive surface on said assembly;

a fourth circular piece of sheet metal coaxial with said other three pieces and clamped intermediate said outer margin of said conical bracing portion and the outer periphery of said third piece, said fourth piece including an annular bearing locating flange extending axially toward said bearing pocket and defining a central opening which extends from adjacent said third piece and opens toward said central recess of said second piece; said central recess of said second piece including a central aperture therethrough which is coaxial with said central aperture in said first piece and said central opening of said fourth piece.

19. The assembly of claim 18 including a first bearing received and axially and radially retained in said bearing pocket; a second bearing coaxial with said first bearing and received within and radially located by said bearing locating flange; a common axle received through and supporting said first and second bearings and having restraining means thereon for axially restraining said bearings; and spacing means received over said axle and intermediate said bearings for spacing said bearings apart within said assembly; said second bearing being axially movable in said bearing locating flange until restrained by said restraining means on said axle.

20. The assembly of claim 19 wherein each of said first and second bearings includes an outer race, an inner race, a plurality of rolling elements between said races, and a pair of axially spaced seals, one seal located adjacent each axial end of said bearing and secured to said outer race for movement therewith and slidably and sealingly engaging said inner race to retain lubricant within said bearing.

21. A drive disc-pulley assembly comprising:

first and second coaxial, circular pieces of stamped sheet metal each having a central recess opening axially toward the other, and axially opposing, flared portions radially offset from said recesses, said recesses together forming a bearing pocket for receiving a bearing, said flared portions forming a V-belt receiving groove axially aligned and concentric with said bearing pocket, said first and second pieces being secured together intermediate said bearing pocket and V-belt groove;

a conical bracing portion extending in one piece with said axially flared portion on said second circular piece, and outwardly and to one side of said V-belt groove, said conical bracing portion having a radially extending outer margin and edge;

said first circular piece having a central aperture in its central recess providing an axle receiving opening to said bearing pocket;

a third, radially extending, generally planar, circular piece of sheet metal coaxial with said first and second pieces and supported by said radially extending outer margin of said conical bracing portion, the outer periphery of said third piece being bent around said outer edge of said second piece to securely clamp said third piece to said second to form a friction wheel drive surface on said assembly;

a curved depression in said third piece of sheet metal; said bearing pocket including a curved wall on said second piece closing the axial end of said bearing pocket adjacent said third piece, said curved wall engaging and supporting said curved depression and thus said third piece.

22. A drive disc-pulley assembly comprising:

a first, circular piece of sheet metal having a first, axially flared, outer peripheral margin forming one side of a V-belt receiving groove, a first central, axially opening cup-shaped recess forming one side of a bearing pocket and including a central aperture through said sheet metal, and a radially extending web connecting said first outer margin and said first recess;

a second circular piece of sheet metal having a second, central, cup-shaped recess opening axially toward said first cup-shaped recess in said first circular piece and forming the opposite side of said bearing pocket, a second flared portion flared axially away from said first outer margin and forming the opposite side of said V-belt receiving groove, and a radially extending web connecting said second outer margin and said second recess; said second outer margin extending continuously into a conical portion extending beyond and away from said V-belt groove, said conical portion ending with a radially-extending margin having an outer edge;

said web of said second circular piece secured to said web of said first circular piece such that said recesses form a bearing pocket axially aligned and concentric with said V-belt groove;

a third, circular, generally planar, radially extending piece of sheet metal axially offset from said V-belt groove and forming a friction drive wheel engaging surface having a diameter larger than the largest diameter of said V-belt groove and supported by said radially extending margin of said second piece, the entire outer periphery of said third piece being bent continuously around the outer edge of said radially extending margin of said second piece such that said second piece outer edge is securely clamped thereby and said friction drive wheel engaging surface is smooth and continuous in the region of said outer periphery of said third piece; and axially extending means adjacent said third piece of sheet metal for providing a bearing locator opening toward said bearing pocket.

* * * * *

UNITED STATES PATENT AND TRADEMARK OFFICE
CERTIFICATE OF CORRECTION

PATENT NO. : 4,265,133
DATED : May 5, 1981
INVENTOR(S) : Van Der Meulen et al.

It is certified that error appears in the above—identified patent and that said Letters Patent is hereby corrected as shown below:

Column 1, line 33:

"were" should be --was--

Column 3, line 8:

"on" should be --in--

Column 3, line 28:

"elevational" should be --elevation--

Column 3, line 59:

"is" should be --as--

Column 4, line 24:

"by" should be --to--

Column 5, line 59:

"92" should be --94--

UNITED STATES PATENT AND TRADEMARK OFFICE
CERTIFICATE OF CORRECTION

PATENT NO. : 4,265,133
DATED : May 5, 1981
INVENTOR(S) : Van Der Meulen et al.

It is certified that error appears in the above—identified patent and that said Letters Patent is hereby corrected as shown below:

Column 5, line 63:

"92" should be --94--

Column 6, line 53:

"12" should be --112--

Signed and Sealed this

Eighteenth Day of August 1981

[SEAL]

Attest:

GERALD J. MOSSINGHOFF

Attesting Officer    Commissioner of Patents and Trademarks